United States Patent
Ye

(10) Patent No.: US 11,334,184 B2
(45) Date of Patent: May 17, 2022

(54) TOUCH SENSING DEVICE AND DISPLAY PANEL WITH COMPENSATION ELECTRODES THAT INCREASE AREA OF TOUCH ELECTRODE CUT BY THROUGH-HOLE

(71) Applicant: Wuhan China Star Optoelectronics Semiconductor Display Technology Co., Ltd., Hubei (CN)

(72) Inventor: Jian Ye, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 190 days.

(21) Appl. No.: 16/641,125

(22) PCT Filed: Dec. 18, 2019

(86) PCT No.: PCT/CN2019/126130
§ 371 (c)(1),
(2) Date: Feb. 21, 2020

(87) PCT Pub. No.: WO2021/068407
PCT Pub. Date: Apr. 15, 2021

(65) Prior Publication Data
US 2021/0397320 A1   Dec. 23, 2021

(30) Foreign Application Priority Data
Oct. 11, 2019  (CN) .......................... 201910965020.5

(51) Int. Cl.
*G06F 3/041* (2006.01)
*G06F 3/044* (2006.01)

(52) U.S. Cl.
CPC ........ *G06F 3/04164* (2019.05); *G06F 3/0412* (2013.01); *G06F 3/0446* (2019.05); *G06F 3/0448* (2019.05); *G06F 2203/04111* (2013.01)

(58) Field of Classification Search
CPC .. G06F 3/0412; G06F 3/04164; G06F 3/0446; G06F 3/0448; G06F 2203/04111
See application file for complete search history.

(56) References Cited

U.S. PATENT DOCUMENTS

2014/0111709 A1* 4/2014 Kim .................. G06F 3/0443
  349/12
2020/0064968 A1* 2/2020 Kim .................. G06F 3/0445
(Continued)

*Primary Examiner* — Liliana Cerullo
(74) *Attorney, Agent, or Firm* — Taft Stettinius & Hollister LLP

(57) ABSTRACT

The present disclosure provides a touch sensing device and a touch control display panel. The touch control display panel includes the touch sensing device. The touch sensing device includes a buffer layer, a first metal layer, a passivation layer, a second metal layer, and a planarization layer, and is provided with a through-hole. A position surrounding the through-hole further includes a first compensation electrode and a second compensation electrode. The first compensation electrode is disposed around the through-hole to form a circular arc shape and is electrically connected to first electrodes adjacent to the through-hole, and the second compensation electrode is disposed around the through-hole to form a circular arc shape and is electrically connected to second electrodes adjacent to the through-hole.

14 Claims, 6 Drawing Sheets

(56) References Cited

U.S. PATENT DOCUMENTS

2020/0110525 A1* 4/2020 Park ................... G06F 3/044
2020/0393936 A1* 12/2020 Bok ................... G06F 3/0443
2020/0411598 A1* 12/2020 Gwon ................ G06F 3/04164
2021/0096697 A1* 4/2021 Do .................... G06F 3/0447

* cited by examiner

TOUCH SENSING DEVICE AND DISPLAY PANEL WITH COMPENSATION ELECTRODES THAT INCREASE AREA OF TOUCH ELECTRODE CUT BY THROUGH-HOLE

CROSS REFERENCE TO RELATED APPLICATIONS

This application claims priority to, and the benefit of, International Application No. PCT/CN2019/126130, filed on Dec. 18, 2019, which claims priority to, and the benefit of, Chinese Application No. 201910965020.5, filed on Oct. 11, 2019. The entire disclosures of each of the above applications are incorporated herein by reference.

FIELD OF INVENTION

The present disclosure relates to the field of display technologies, and more particularly, to a touch sensing device and a touch control display panel.

BACKGROUND OF INVENTION

Capacitive touch screens are widely used in electronic interactive scene equipment due to their high durability, long service life, and functions of supporting multi touch.

Capacitive touch screens detect a specific position touched by a finger by detecting a capacitance change in the position touched by the finger. Therefore, traditional capacitive touch screens may not accurately detect a touch input when the capacitance change triggered by touch is small. Because a structural design of touch screens is a very important factor for detecting the capacitance change, it is necessary to develop a touch screen design for detecting small capacitance changes.

At present, for flexible active matrix organic light-emitting display (AMOLED) screens, a touch control electrode pattern thereof usually needs to be manufactured directly on an upper surface of a thin film encapsulation layer, and touch control electrodes are usually hollow metal meshes. These hollow metal meshes have an actual effective conductive electrode area that is smaller than traditional touch control electrodes with a whole surface transparent indium tin oxide material. Therefore, mutual capacitance between a drive electrode TX and a sense electrode RX of touch control electrodes is very small, which causes a triggered capacitance change to be even smaller when touched by a finger and is not easily detected by a touch control chip (touch IC).

With rapid development of smart phones toward full screens, a requirement for screen ratio is getting higher, such as a current notch design of iPhone X, which only reserves a space for a front camera on a "forehead" of a mobile phone, while other areas are all display areas.

To achieve a higher screen ratio, an in-screen camera solution is developed, that is, a flexible AMOLED screen uses a circular hole-opening design to open a circular hole in the screen and under a position corresponding to the front camera, thereby making the "forehead" of smart phones further narrowed and closer to a full screen than a notch screen. Because touch control electrodes in the hole-opening position are cut off, the touch control electrode pattern in the position of the circular hole is not complete, which further reduces an area of the originally hollow touch control electrodes as well as a triggered capacitance change caused by a finger touch, thereby causing touch at edges of the circular hole to not be sensed, or even causing invalidation.

Technical problem: an objective of the present disclosure is to provide a touch sensing device and a touch control display panel to effectively solve a problem that a touch cannot be detected as a result of a weaker touch control signal due to touch control electrodes being cut off in a front camera hole-opening area, thereby effectively improving touch sensitivity in the front camera hole-opening area.

SUMMARY OF INVENTION

To achieve the above objective, the present disclosure provides a touch sensing device which comprises a buffer layer, a first metal layer, a passivation layer, a second metal layer, and a planarization layer. Specifically, the first metal layer is disposed on the buffer layer; the passivation layer is disposed on the first metal layer; the second metal layer is disposed on the passivation layer, wherein one of the first metal layer or the second metal layer comprises a plurality of electrode bridges, another one of the first metal layer or the second metal layer comprises a plurality of first electrodes arranged in a plurality of rows along a lateral direction and a plurality of second electrodes arranged in a plurality of columns along a longitudinal direction, the first electrodes in a same row are electrically connected to each other in sequence by the electrode bridges, the second electrodes in a same column are electrically connected to each other in sequence by electrode lines, and the electrode lines are formed by patterning the second metal layer; and the planarization layer is disposed on the second metal layer. Wherein, the touch sensing device is further provided with a through-hole, and a position surrounding the through-hole comprises a first compensation electrode and a second compensation electrode. The first compensation electrode is disposed around the through-hole to form a circular arc shape and is electrically connected to first electrodes adjacent to the through-hole, and the second compensation electrode is disposed around the through-hole to form a circular arc shape and is electrically connected to second electrodes adjacent to the through-hole.

Further, wherein a center of the through-hole is disposed in an area surrounded by four of the electrode bridges adjacent to the through-hole in upper/lower and right/left directions.

Further, wherein an area of the first electrodes adjacent to the through-hole is negatively correlated with a distance from a midpoint of the first electrodes to a center of the through-hole, and an area of the second electrodes adjacent to the through-hole is negatively correlated with a distance from a midpoint of the second electrodes to the center of the through-hole.

Further, wherein a distance from a midpoint of the first electrodes adjacent to the through-hole to a center of the through-hole is positively correlated with an area of the first compensation electrode, and a distance from a midpoint of the second electrodes adjacent to the through-hole to the center of the through-hole is positively correlated with an area of the second compensation electrode.

Further, wherein edge positions of the first electrodes are provided with a plurality of inverted T-shaped first edge electrodes arranged uniformly, first spacer regions are disposed between two of the adjacent first edge electrodes, edge positions of the second electrodes are provided with a plurality of inverted T-shaped second edge electrodes arranged uniformly, second spacer regions are disposed between two of the adjacent second edge electrodes, the first edge electrodes are disposed in the first spacer regions, and the second edge electrodes are disposed in the second spacer regions.

Further, wherein an insulation medium is disposed between the first compensation electrode and the second compensation electrode.

Further, wherein a center of the circular arc of the first compensation electrode and a center of the circular arc of the second compensation electrode coincide with a center of the through-hole.

Further, wherein a diameter of the circular arc of the first compensation electrode is not equal to a diameter of the circular arc of the second compensation electrode.

Further, wherein a diameter of the circular arc of the first compensation electrode is equal to a diameter of the circular arc of the second compensation electrode.

Further, wherein a width of the first compensation electrode is equal to a width of the second compensation electrode.

Further, the first compensation electrode includes a first compensation driving electrode and a first compensation sensing electrode. The first compensation driving electrode is electrically connected to the first electrodes on one side of the through-hole, and the first compensation sensing electrode is electrically connected to the first electrodes on another side of the through-hole.

Further, wherein an insulation medium is disposed between the first compensation driving electrode and the first compensation sensing electrode disposed on different rows.

Further, the second compensation electrode includes a second compensation driving electrode and a second compensation sensing electrode. The second compensation driving electrode is electrically connected to the second electrodes on one side of the through-hole, and the second compensation sensing electrode is electrically connected to the second electrodes on another side of the through-hole.

Further, wherein an insulation medium is disposed between the second compensation electrode and the second compensation electrode disposed on different rows.

To achieve the above objective, the present disclosure further provides a touch control display panel which comprises the above touch sensing device.

Beneficial effect: the touch sensing device and the touch control display panel are provided by disposing the first compensation electrode and the second compensation electrode in a hole-opening area surrounding a front camera, that is the through-hole position, to effectively solve the problem that a touch cannot be detected as a result of a weaker touch control signal due to touch control electrodes being cut off in a front camera hole-opening area, thereby effectively improving touch sensitivity in the front camera hole-opening area.

DETAILED DESCRIPTION OF PREFERRED EMBODIMENTS

The preferred embodiments of the present disclosure are described in detail below with reference to the accompanying drawings. The specific embodiments described with reference to the attached drawings are all exemplary and are intended to illustrate and interpret the present disclosure to make the skilled in the art easier to understand how to implement the present disclosure. The disclosure herein provides many different embodiments or examples for realizing different structures of the present disclosure. They are only examples and are not intended to limit the present disclosure.

Embodiment 1

Figure 1:
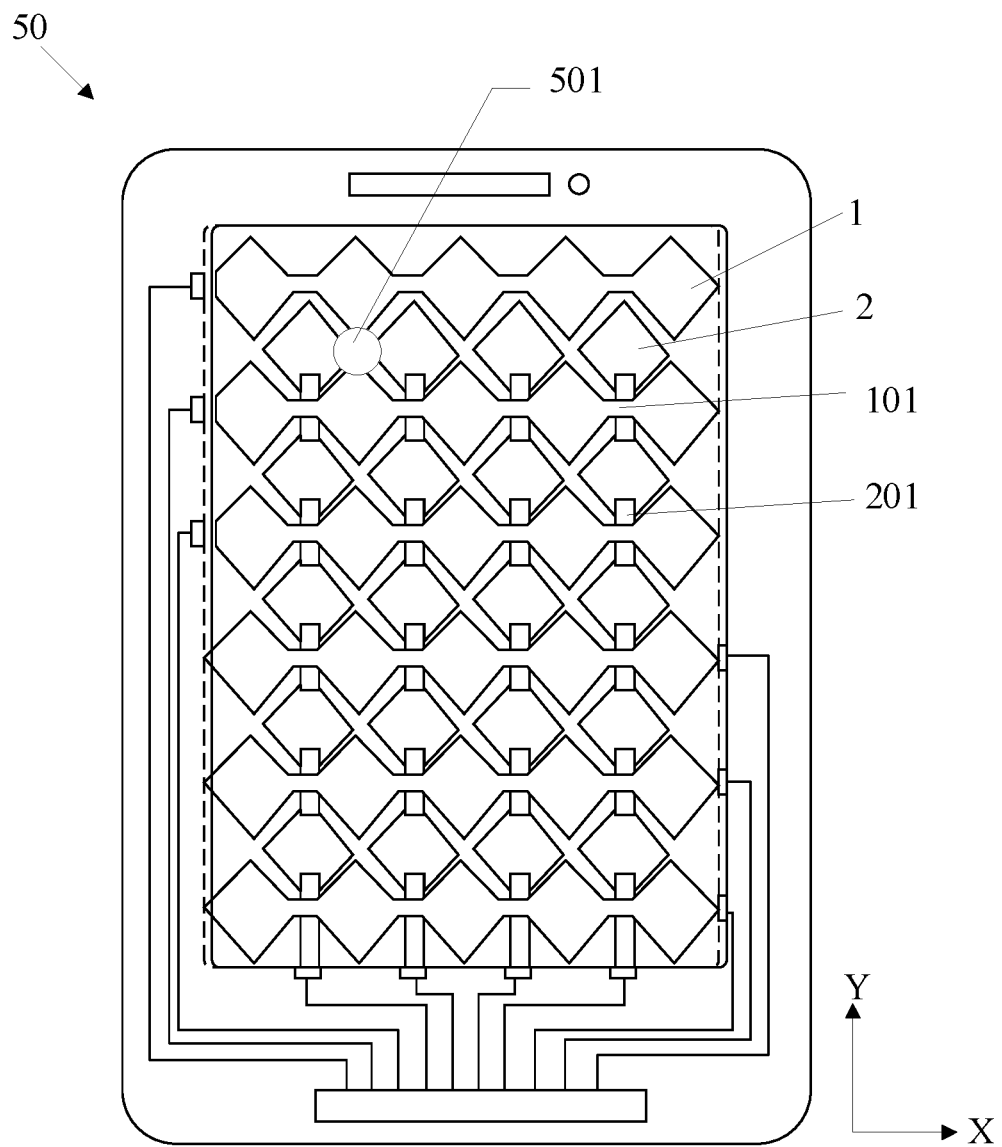
FIG. 1 is a schematic overall planar structural diagram of a touch sensing device according to a first embodiment of the present disclosure.

As shown in FIG. 1, the embodiment provides a touch sensing device 50. The touch sensing device 50 comprises a plurality of first electrodes 1 arranged along a lateral direction and a plurality of second electrodes 2 arranged along a longitudinal direction, and the first electrodes 1 and the second electrodes 2 are insulated from each other. Wherein, among the first electrodes 1 arranged along the lateral direction, all of the first electrodes 1 on a same straight line are electrically connected to each other in sequence by electrode bridges 101 to form a first touch control line, and among the second electrodes 2 arranged along the longitudinal direction, all of the second electrodes 2 on a same straight line are electrically connected to each other in sequence by electrode lines 201 in a same layer to form a second touch control line. The touch sensing device 50 is further provided with a through-hole 501, the through-hole 501 is used to correspondingly dispose an under-display camera, and a position of the through-hole 501 is a front camera hole-opening area. In FIG. 1, the lateral direction is indicated by the X-axis direction, and the longitudinal direction is indicated by the Y-axis direction.

Figure 2:
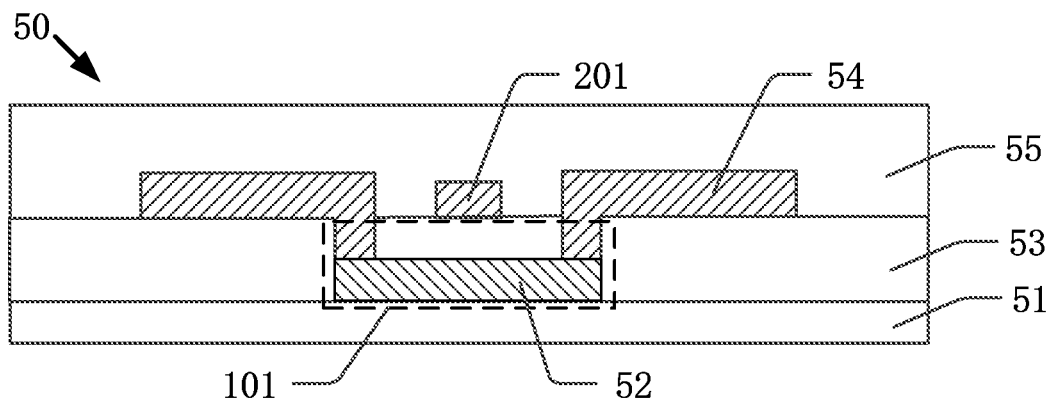
FIG. 2 is a schematic cross-sectional structural diagram of the touch sensing device according to the first embodiment of the present disclosure.

As shown in FIG. 2, the touch sensing device 50 includes a buffer layer 51, a first metal layer 52, a passivation layer 53, a second metal layer 54, and a planarization layer 55. Specifically, the first metal layer 52 is disposed on the buffer layer 51. The passivation layer 53 is disposed on the first metal layer 52. A material of the passivation layer 53 is an inorganic material which acts as an insulation medium, and the inorganic material may be, but is not limited to, a flexible material such as SiN or SiON. The second metal layer 54 is disposed on the passivation layer 53. One of the first metal layer 52 or the second metal layer 54 comprises the plurality of electrode bridges 101, while another one of the first metal layer 52 or the second metal layer 54 comprises the plurality of first electrodes 1 arranged in a plurality of rows along the lateral direction and the plurality of second electrodes 2 arranged in a plurality of columns along the longitudinal direction. The first electrodes 1 in a same row are electrically connected to each other in sequence by the electrode bridges 101, and the second electrodes 2 in a same column are electrically connected to each other in sequence by the electrode lines 201. As shown in FIG. 2, in this embodiment, the electrode bridges 101 are preferably disposed in the first metal layer 52, the first electrodes 1 and the second electrodes 2 are disposed in the second metal layer 54, and the electrode lines 201 are formed by patterning the second metal layer 54. Preferably, the lateral direction is perpendicular to the longitudinal direction. The planarization layer 55 is disposed on the second metal layer 54. A material of the planarization layer 55 is an organic material, which also acts as an insulation medium and has a good flexibility. The organic material may be, but is not limited to, polymethyl methacrylate (PMMA), epoxy resins, phenolic resins, acrylic resins, or methacrylic resins.

In other words, the first electrodes 1 are arranged along the lateral direction and have a meshed shape, adjacent first electrodes 1 are electrically connected to each other along the lateral direction to constitute the first touch control line, the second electrodes 2 are arranged along the longitudinal direction crossing the lateral direction and have a meshed shape, the adjacent second electrodes 2 are electrically connected to each other along the longitudinal direction to constitute the second touch control line, and the first touch control line and the second touch control line are insulated from each other by the passivation layer 53 and form bridge structures, that is the electrode bridges 101.

Figure 3:
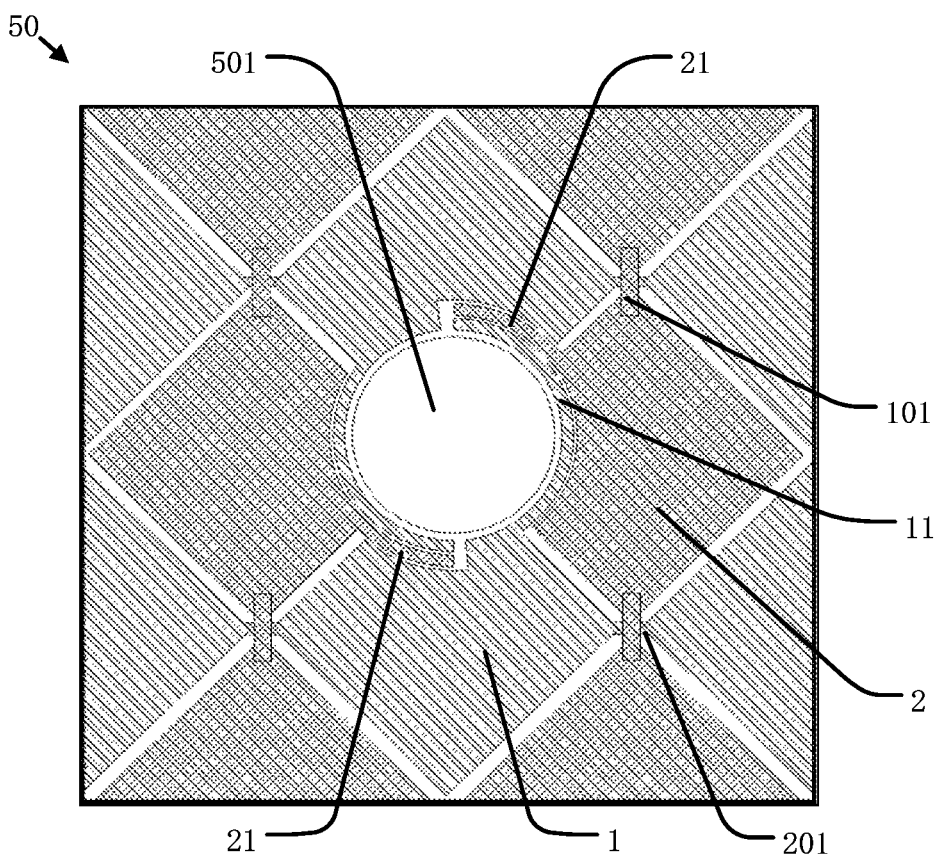
FIG. 3 is a partial schematic planar structural diagram of the touch sensing device according to the first embodiment of the present disclosure.

As shown in FIG. 3, a position surrounding the through-hole 501 further comprises a first compensation electrode 11 and a second compensation electrode 21. The first compensation electrode 11 is disposed around the through-hole 501 to form a circular arc shape and is electrically connected to the first electrodes 1 adjacent to the through-hole 501, and the second compensation electrode 21 is disposed around the through-hole 501 to form a circular arc shape and is electrically connected to the second electrodes 2 adjacent to the through-hole 501.

An opening position of the through-hole 501 has two following situations:

When a position of the through-hole 501 is set at a default position of the electrode bridges 101, the electrode bridges 101 are disposed around the position of the through-hole 501. As the situation of this method affects positional changes of the electrode lines 201, it should be avoided.

When the position of the through-hole 501 is not set at the default position of the electrode bridges 101, the through-hole 501 is defined between the first electrodes 1 in different rows or between the second electrodes 2 in different columns, and the first electrodes 1 in a same row are electrically connected to each other by the electrode bridges 101. When the through-hole 501 is completely defined on the first electrode 1 or the second electrode 2, it is not necessary to dispose the first compensation electrode 11 and the second compensation electrode 21. When the through-hole 501 is defined in an area surrounded by four of the electrode bridges 101 adjacent to the through-hole in upper/lower and right/left directions, a part of the first electrodes 1 and the second electrodes 2 corresponding to the through-hole 501 are cut off, so the first compensation electrode 11 and the second compensation electrode 21 are disposed surrounding the position of the through-hole 501 to increase an area of the first electrodes 1 and the second electrodes 2, thereby increasing intensity of touch control signals.

The embodiment preferably disposes a center of the through-hole 501 in the area surrounded by four of the electrode bridges 101 adjacent to each other in upper/lower and right/left directions. If the center of the through-hole 501 coincides with a center of the four of the electrode bridges 101 adjacent to each other in upper/lower and right/left directions, resection areas of the first electrodes 1 and the second electrodes 2 are the same, and the first compensation electrode 11 and the second compensation electrode 21 are disposed to have a same area. Therefore, capacitance of each row of touch control lines on upper, lower, left, and right sides of the through-hole 501 is the same, thereby making overall mutual capacitance value more uniform.

When the center of the through-hole 501 does not coincide with the center of the four of the electrode bridges 101 adjacent to each other in upper/lower and right/left directions, that is, the center of the through-hole 501 is shifted in a direction with respect to the center of the four of the electrode bridges 101 adjacent to each other in upper/lower and right/left directions, resection areas of the first electrodes 1 and the second electrodes 2 will also be different. At this time, the first compensation electrode 11 and the second compensation electrode 21 need to be disposed to have different areas to make the overall mutual capacitance value more uniform.

It should be understood that an area of the first electrodes 1 adjacent to the through-hole 501 is negatively correlated with a distance from a midpoint of the first electrodes 1 to the center of the through-hole 501, and an area of the second electrodes 2 adjacent to the through-hole 501 is negatively correlated with a distance from a midpoint of the second electrodes 2 to the center of the through-hole 501. Similarly, a distance from a midpoint of the first electrodes 1 adjacent to the through-hole 501 to the center of the through-hole 501 is positively correlated with an area of the first compensation electrode 11, and a distance from a midpoint of the second electrodes 2 adjacent to the through-hole 501 to the center of the through-hole 501 is positively correlated with an area of the second compensation electrode 21. This disposition can prevent a great difference between mutual capacitance values of the first electrodes 1 and the second electrodes 2, thereby making the overall mutual capacitance value more uniform.

In the embodiment, an insulation medium is disposed between the first electrodes 1 and the second electrodes 2 to insulate them from each other, and an insulation medium is disposed between the first compensation electrode 11 and the second compensation electrode 21 to insulate them from each other, thereby preventing the first electrodes 1 connected to the first compensation electrode 11 from electrically connecting to the second electrodes 2 connected to the second compensation electrode 21 and preventing crosstalk of the touch control signals, which causes decreased touch sensitivity.

In the embodiment, a center of the circular arc of the first compensation electrode 11 and a center of the circular arc of the second compensation electrode 21 coincide with a center of the through-hole 501, that is, concentric circles. The coincidence of the centers of the circles where the first compensation electrode 11, the second compensation electrode 21, and the through-hole 501 are located is more beneficial for preventing mutual interference during manufacturing, which causes short circuits and open circuits. The corresponding disposition of the first compensation electrode 11 and the second compensation electrode 21 may be the two disposed in a same circle, wherein a gap between the first compensation electrode 11 and the second compensation electrode 21 is filled with the insulation medium to insulate the first compensation electrode 11 and second compensation electrode 21.

In the embodiment, a diameter of the circular arc of the first compensation electrode 11 is not equal to a diameter of the circular arc of the second compensation electrode 21. This disposition can increase the area of the first compensation electrode 11 and the second compensation electrode 21 to increase the intensity of the touch control signals. Preferably in the embodiment, the first compensation electrode 11 and the second compensation electrode 21 are disposed in concentric circles with different diameters, wherein the first compensation electrode 11 and the second compensation electrode 21 are preferably circular arcs disposed surrounding the through-hole 501 in a way of concentric circles, which can achieve a largest area in a limited space. The disposition in the way of concentric circles can achieve the first compensation electrode 11 and the second compensation electrode 21 having the gap filled with the insulation medium to insulate them from each other.

Preferably in the embodiment, a width of the first compensation electrode 11 is equal to a width of the second compensation electrode 21.

Figure 4:
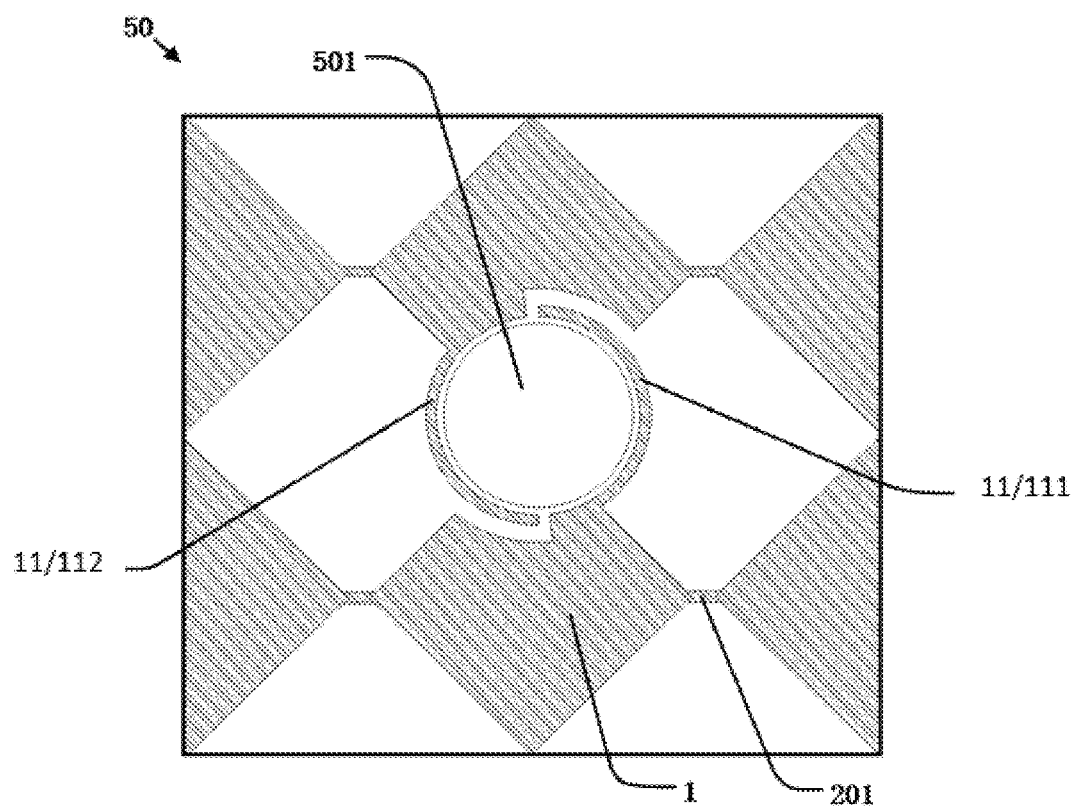
FIG. 4 is a partial schematic structural diagram of a connection relationship of a first electrode and a first compensation electrode in FIG. 3.

As shown in FIG. 4, in the embodiment, the first compensation electrode 11 includes a first compensation driving electrode 111 and a first compensation sensing electrode 112. The first compensation driving electrode 111 is electrically connected to the first electrodes 1 on one side of the through-hole 501, and the first compensation sensing electrode 112 is electrically connected to the first electrodes 1 on another side of the through-hole 501.

In the embodiment, an insulation medium is disposed between the first compensation driving electrode 111 and the first compensation sensing electrode 112 disposed on different rows to insulate the first compensation driving electrode 111 and the first compensation sensing electrode 112.

Figure 5:
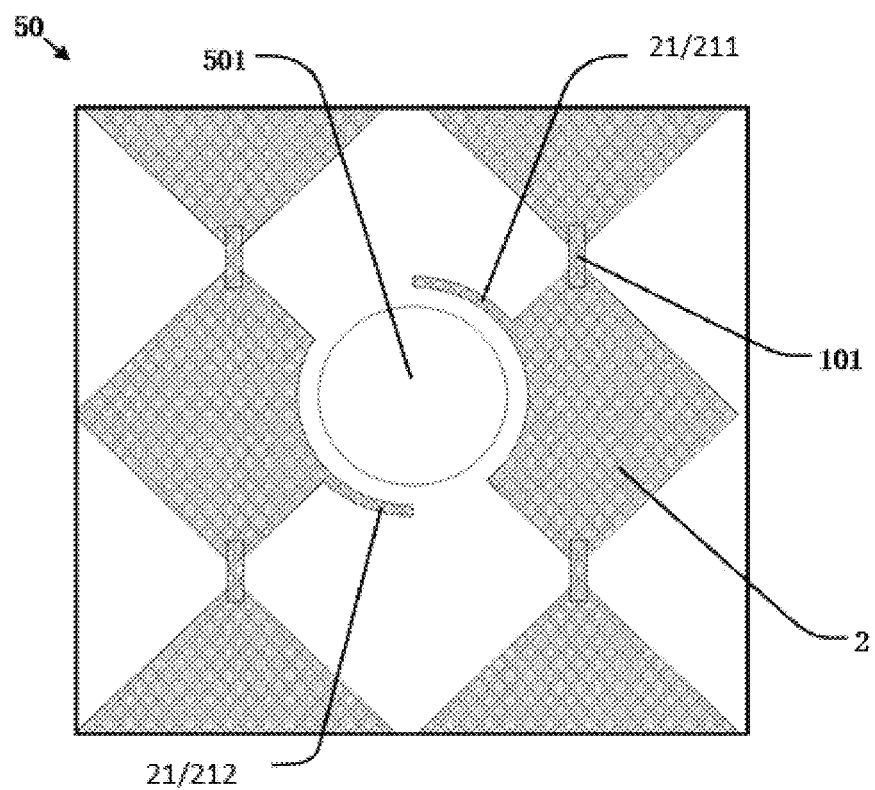
FIG. 5 is a partial schematic structural diagram of a connection relationship of a second electrode and a second compensation electrode in FIG. 3.

As shown in FIG. 5, in the embodiment, the second compensation electrode 21 includes a second compensation driving electrode 211 and a second compensation sensing electrode 212. The second compensation driving electrode 211 is electrically connected to the second electrodes 2 on one side of the through-hole 501, and the second compensation sensing electrode 212 is electrically connected to the second electrodes 2 on another side of the through-hole 501.

In the embodiment, an insulation medium is disposed between the second compensation electrode 21 and the second compensation electrode 21 disposed on different rows to insulate the second compensation electrode 21 and the second compensation electrode 21.

It should be noted that the touch control principle in the embodiment is the same with the touch control principle in current technology: the first electrodes 1 on a same row are electrically connected to each other, and the first electrodes 1 on different rows are insulated from each other. A material of the insulation medium is an inorganic material which acts as an insulation medium, and the inorganic material may be, but is not limited to, a flexible material such as SiN or SiON.

Embodiment 2

Figure 6:
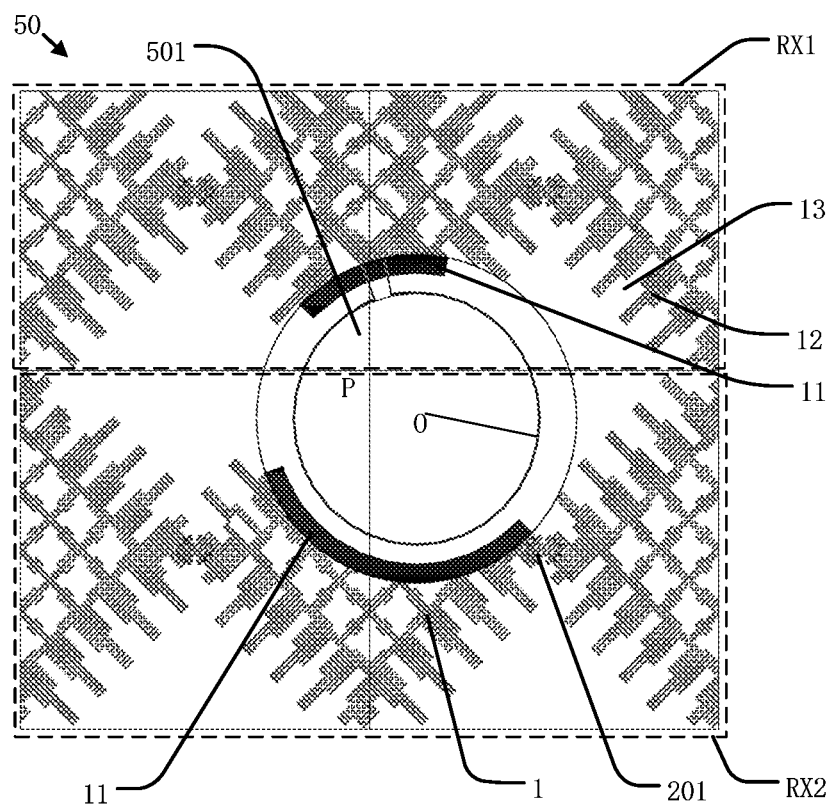
FIG. 6 is a partial schematic structural diagram of a connection relationship of a first electrode and a first compensation electrode according to a second embodiment of the present disclosure.
Figure 7:
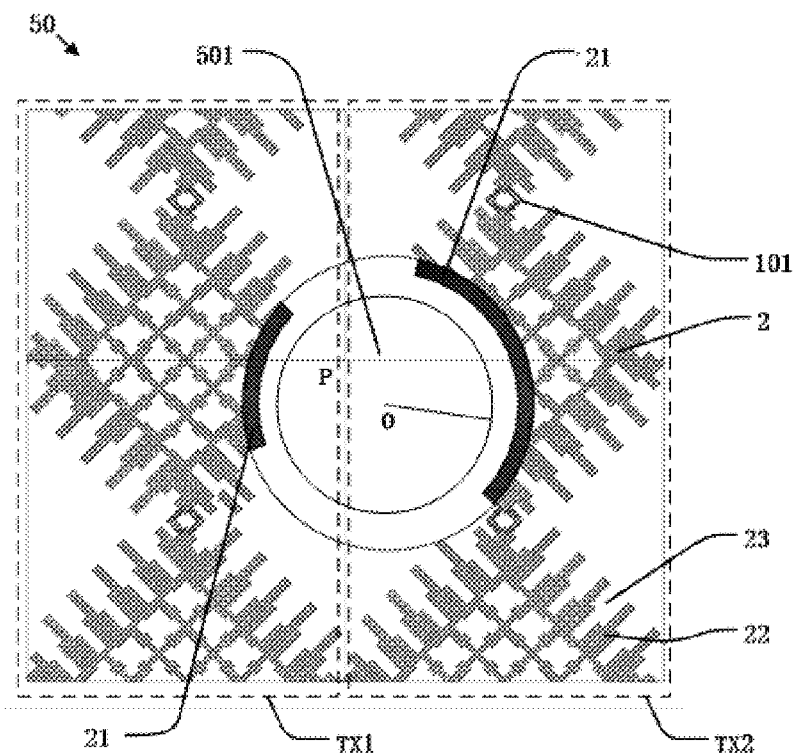
FIG. 7 is a partial schematic structural diagram of a connection relationship of a second electrode and a second compensation electrode according to the second embodiment of the present disclosure.

As shown in FIG. 6 and FIG. 7, the embodiment 2 comprises most technical features in the embodiment 1. The difference is that the diameter of the circular arc of the first compensation electrode 11 is equal to the diameter of the circular arc of the second compensation electrode 21, rather than the diameter of the circular arc of the first compensation electrode 11 not being equal to the diameter of the circular arc of the second compensation electrode 21.

Preferably in the embodiment, a width of the first compensation electrode 11 is equal to a width of the second compensation electrode 21. That is, circular arcs of the first compensation electrode 11 and the second compensation electrode 21 are in a same circle.

As shown in FIG. 6 and FIG. 7, edge positions of the first electrodes 1 are provided with a plurality of inverted T-shaped first edge electrodes 12 arranged uniformly, first spacer regions 13 are disposed between two of the adjacent first edge electrodes 12, edge positions of the second electrodes 2 are provided with a plurality of inverted T-shaped second edge electrodes 22 arranged uniformly, second spacer regions 23 are disposed between two of the adjacent second edge electrodes 22, the first edge electrodes 12 are disposed in the second spacer regions 23, and the second edge electrodes 22 are disposed in the first spacer regions 13.

As shown in FIG. 6, the first electrodes 1 are arranged along the lateral direction. To divide the first electrodes 1 adjacent to the through-hole 501 in the lateral and longitudinal directions into four quadrants based on a center point P of the circle formed by the four electrode bridges 101 adjacent to the through-hole 501 in upper/lower and right/left directions, the first electrodes 1 arranged along the lateral direction comprise RX1 disposed on the through-hole 501 and RX2 disposed under the through-hole 501. A center point O of the through-hole 501 does not coincide with the center point P of the circle formed by the four electrode bridges 101 adjacent to the through-hole 501 in upper/lower and right/left directions. The point O is shifted to the lower right from the point P, a resection area of the first electrodes 1 on a lower side is greater than a resection area of the first electrodes 1 on an upper side, and an area of the first compensation electrode 11 connected to the first electrodes 1 on the lower side is greater than an area of the first compensation electrode 11 connected to the first electrodes 1 on the upper side, thereby compensating the mutual capacitance value of the first electrodes 1 on the lower side and preventing a greater difference between mutual capacitance values on the upper side and the lower side.

As shown in FIG. 7, the second electrodes 2 are arranged along the longitudinal direction. To divide the second electrodes 2 adjacent to the through-hole 501 also in the lateral and longitudinal directions into four quadrants based on the center point P of the circle formed by the four electrode bridges 101 adjacent to the through-hole 501 in upper/lower and right/left directions, the second electrodes 2 arranged along the longitudinal direction comprise TX1 disposed on the left side of the through-hole 501 and TX2 disposed on the right side of the through-hole 501. A resection area of the second electrodes 2 on the right side is greater than a resection area of the second electrodes 2 on the left side, and an area of the second compensation electrode 21 connected to the second electrodes 2 on the right side is greater than an area of the second compensation electrode 21 connected to the second electrodes 2 on the left side, thereby compensating the mutual capacitance value of the second electrodes 2 on the right side and preventing a greater difference between mutual capacitance values on the left side and the right side.

As shown in following table 1, it shows simulated corresponding compensating mutual capacitance values of corresponding regions shown in FIG. 6 and FIG. 7.

TABLE 1

|  | TX1 | TX2 |
|---|---|---|
| RX1 | 1 fF | 1 fF |
| RX2 | 5 fF | 10 fF |

It can be known from table 1: the capacitance of the first electrodes 1 disposed in the four quadrants surrounding the through-hole 501 can be increased by disposing the first compensation electrode 11, and the capacitance of the second electrodes 2 can be increased by disposing the second compensation electrode 21, thereby preventing a greater difference between the mutual capacitance values and making the overall mutual capacitance value more uniform. Hence, it can compensate insensitive touch in an area caused by a weaker mutual capacitance signal due to touch control electrodes being cut off in the through-hole 501, thereby effectively improving touch sensitivity in the front camera hole-opening area.

Figure 8:
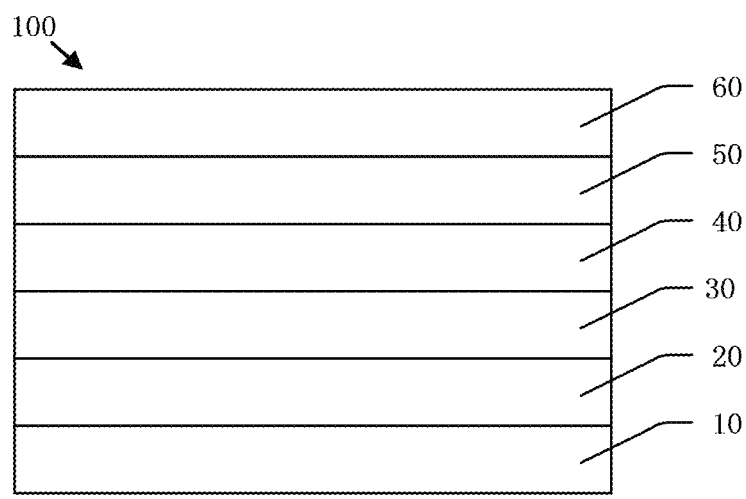
FIG. 8 is a schematic structural diagram of a touch control display panel according to an embodiment of the present disclosure.

As shown in FIG. 8, the present disclosure further provides a touch control display panel 100 which comprises the touch sensing device 50 described above.

The touch control display panel 100 includes a substrate 10, a thin film transistor layer 20, a light-emitting layer 30, a thin film encapsulation layer 40, the touch sensing device 50 described above, and a polarizing layer 60. Wherein, the thin film transistor layer 20, the light-emitting layer 30, the thin film encapsulation layer 40, the touch sensing device 50, and the polarizing layer 60 are disposed on an upper surface of the substrate 10 in sequence.

The technical effect of the present disclosure is to provide the touch sensing device and the touch control display panel by disposing the first compensation electrode and the second compensation electrode 21 in a hole-opening area surrounding a front camera, that is the through-hole 501 position, to effectively solve the problem that a touch cannot be detected as a result of a weaker touch control signal due to touch control electrodes being cut off in a front camera hole-opening area, thereby effectively improving touch sensitivity in the front camera hole-opening area.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A touch sensing device, comprising:
a buffer layer;
a first metal layer disposed on the buffer layer;
a passivation layer disposed on the first metal layer;
a second metal layer disposed on the passivation layer, wherein one of the first metal layer or the second metal layer comprises a plurality of electrode bridges, another one of the first metal layer or the second metal layer comprises a plurality of first electrodes arranged in a plurality of rows along a lateral direction and a plurality of second electrodes arranged in a plurality of columns along a longitudinal direction, the first electrodes in a same row are electrically connected to each other in sequence by the electrode bridges, the second electrodes in a same column are electrically connected to each other in sequence by electrode lines, and the electrode lines are formed by patterning the second metal layer; and a planarization layer disposed on the second metal layer;
wherein the touch sensing device is further provided with a through-hole, and a position surrounding the through-hole comprises:
a first compensation electrode disposed around the through-hole to form a circular arc shape and electrically connected to the first electrodes adjacent to the through-hole; and
a second compensation electrode disposed around the through-hole to form a circular arc shape and electrically connected to the second electrodes adjacent to the through-hole; and
wherein a distance from a midpoint of the first electrodes adjacent to the through-hole to a center of the through-hole is positively correlated with an area of the first compensation electrode, and a distance from a midpoint of the second electrodes adjacent to the through-hole to the center of the through-hole is positively correlated with an area of the second compensation electrode.

2. The touch sensing device according to claim 1, wherein a center of the through-hole is disposed in an area surrounded by four of the electrode bridges adjacent to the through-hole in upper/lower and right/left directions.

3. The touch sensing device according to claim 1, wherein an area of the first electrodes adjacent to the through-hole is negatively correlated with a distance from a midpoint of the first electrodes to a center of the through-hole, and an area of the second electrodes adjacent to the through-hole is negatively correlated with a distance from a midpoint of the second electrodes to the center of the through-hole.

4. The touch sensing device according to claim 1, wherein edge positions of the first electrodes are provided with a plurality of inverted T-shaped first edge electrodes arranged uniformly, first spacer regions are disposed between two of the adjacent first edge electrodes, edge positions of the second electrodes are provided with a plurality of inverted T-shaped second edge electrodes arranged uniformly, second spacer regions are disposed between two of the adjacent second edge electrodes, the first edge electrodes are disposed in the second spacer regions, and the second edge electrodes are disposed in the first spacer regions.

5. The touch sensing device according to claim 1, wherein an insulation medium is disposed between the first compensation electrode and the second compensation electrode.

6. The touch sensing device according to claim 1, wherein a center of the circular arc of the first compensation electrode and a center of the circular arc of the second compensation electrode coincide with a center of the through-hole.

7. The touch sensing device according to claim 6, wherein a diameter of the circular arc of the first compensation electrode is not equal to a diameter of the circular arc of the second compensation electrode.

8. The touch sensing device according to claim 6, wherein a diameter of the circular arc of the first compensation electrode is equal to a diameter of the circular arc of the second compensation electrode.

9. The touch sensing device according to claim 6, wherein a width of the first compensation electrode is equal to a width of the second compensation electrode.

10. The touch sensing device according to claim 1, wherein the first compensation electrode comprises:
a first compensation driving electrode electrically connected to the first electrodes on one side of the through-hole; and a first compensation sensing electrode electrically connected to the first electrodes on another side of the through-hole.

11. The touch sensing device according to claim 10, wherein an insulation medium is disposed between the first compensation driving electrode and the first compensation sensing electrode disposed on different rows.

12. The touch sensing device according to claim 1, wherein the second compensation electrode comprises:
   a second compensation driving electrode electrically connected to the second electrodes on one side of the through-hole; and
   a second compensation sensing electrode electrically connected to the second electrodes on another side of the through-hole.

13. The touch sensing device according to claim 12, wherein an insulation medium is disposed between the second compensation driving electrode and the second compensation sensing electrode disposed on different rows.

14. A touch control display panel, comprising the touch sensing device according to claim 1.

* * * * *